H. FORD.
AUTOMOBILE CONTROL MECHANISM.
APPLICATION FILED DEC. 4, 1909.

1,078,042.

Patented Nov. 11, 1913.
4 SHEETS—SHEET 1.

Witnesses
A. M. Shannon.
A. M. Dorr.

Inventor
HENRY FORD
By
Attorneys

H. FORD.
AUTOMOBILE CONTROL MECHANISM.
APPLICATION FILED DEC. 4, 1909.

1,078,042.

Patented Nov. 11, 1913.

4 SHEETS—SHEET 4.

Witnesses
A. W. Shannon
Anna C. Rauler

Inventor
HENRY FORD

By
Attorneys

UNITED STATES PATENT OFFICE.

HENRY FORD, OF DETROIT, MICHIGAN.

AUTOMOBILE CONTROL MECHANISM.

1,078,042.  Specification of Letters Patent.  Patented Nov. 11, 1913.

Application filed December 4, 1909. Serial No. 531,286.

*To all whom it may concern:*

Be it known that I, HENRY FORD, a citizen of the United States of America, residing at Detroit, in the county of Wayne and State of Michigan, have invented certain new and useful Improvements in Automobile Control Mechanism, of which the following is a specification, reference being had therein to the accompanying drawings.

This invention relates to an automobile control system and more particularly to an arrangement thereof which centralizes the various speed changing and reversing members and simplifies the operation of the car to which it is applied.

The invention consists in the matters hereinafter set forth, and more particularly pointed out in the appended claims.

Figure 1:
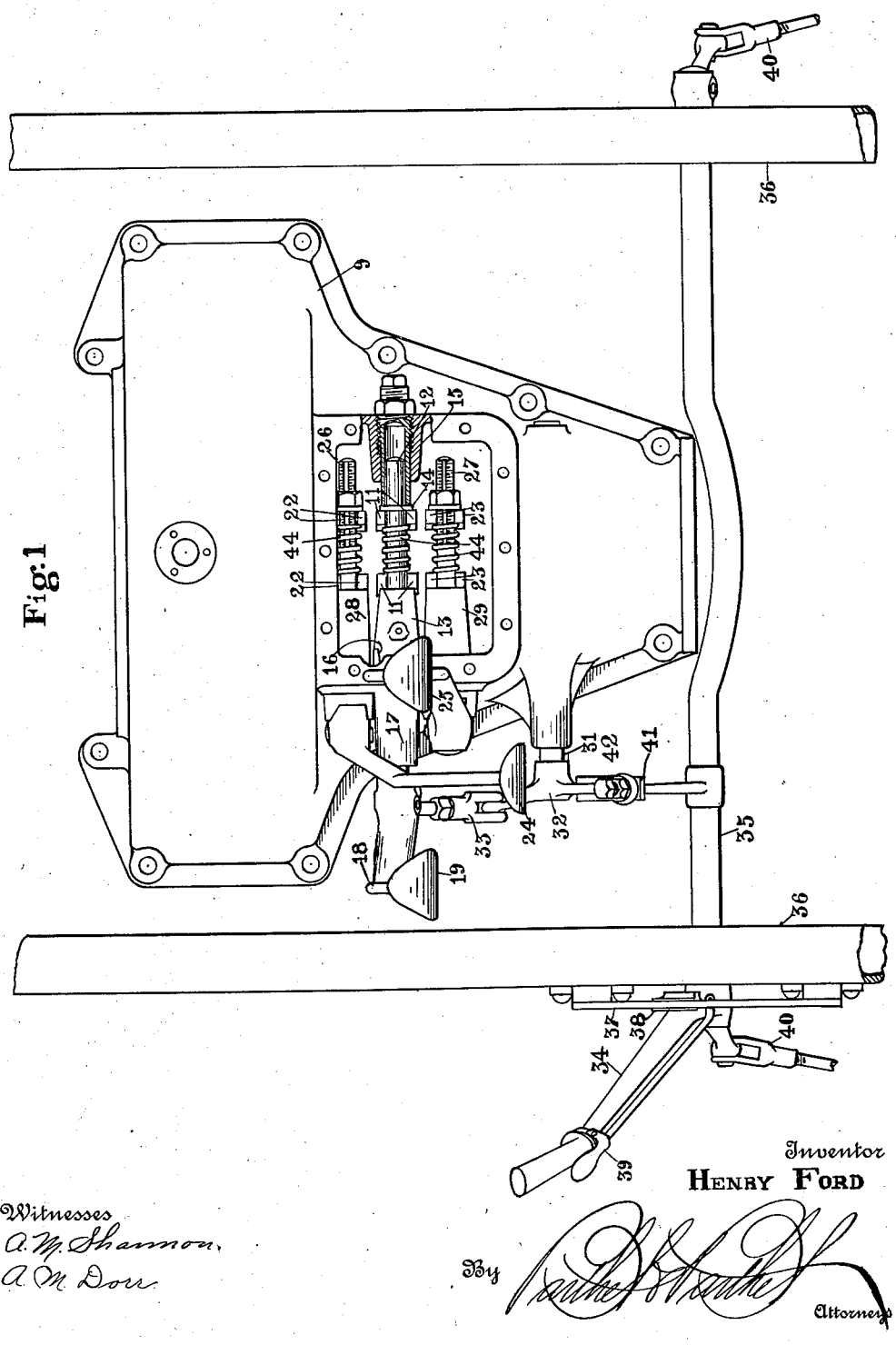
Figure 2:
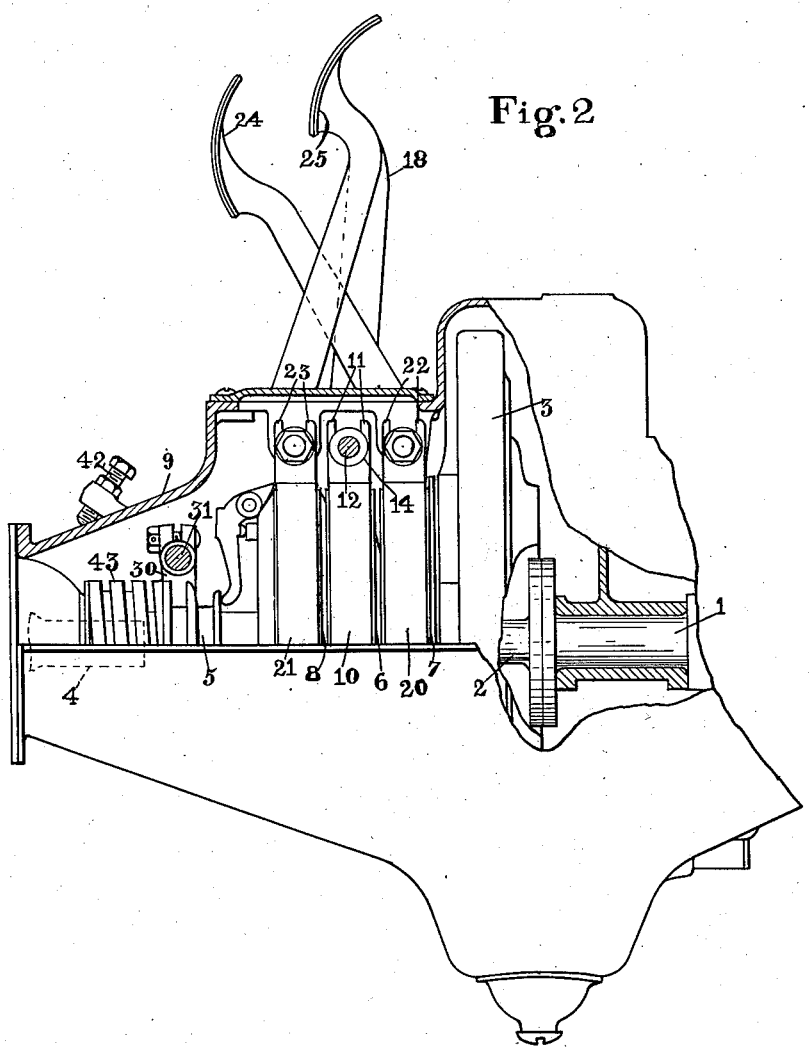
Figure 3:
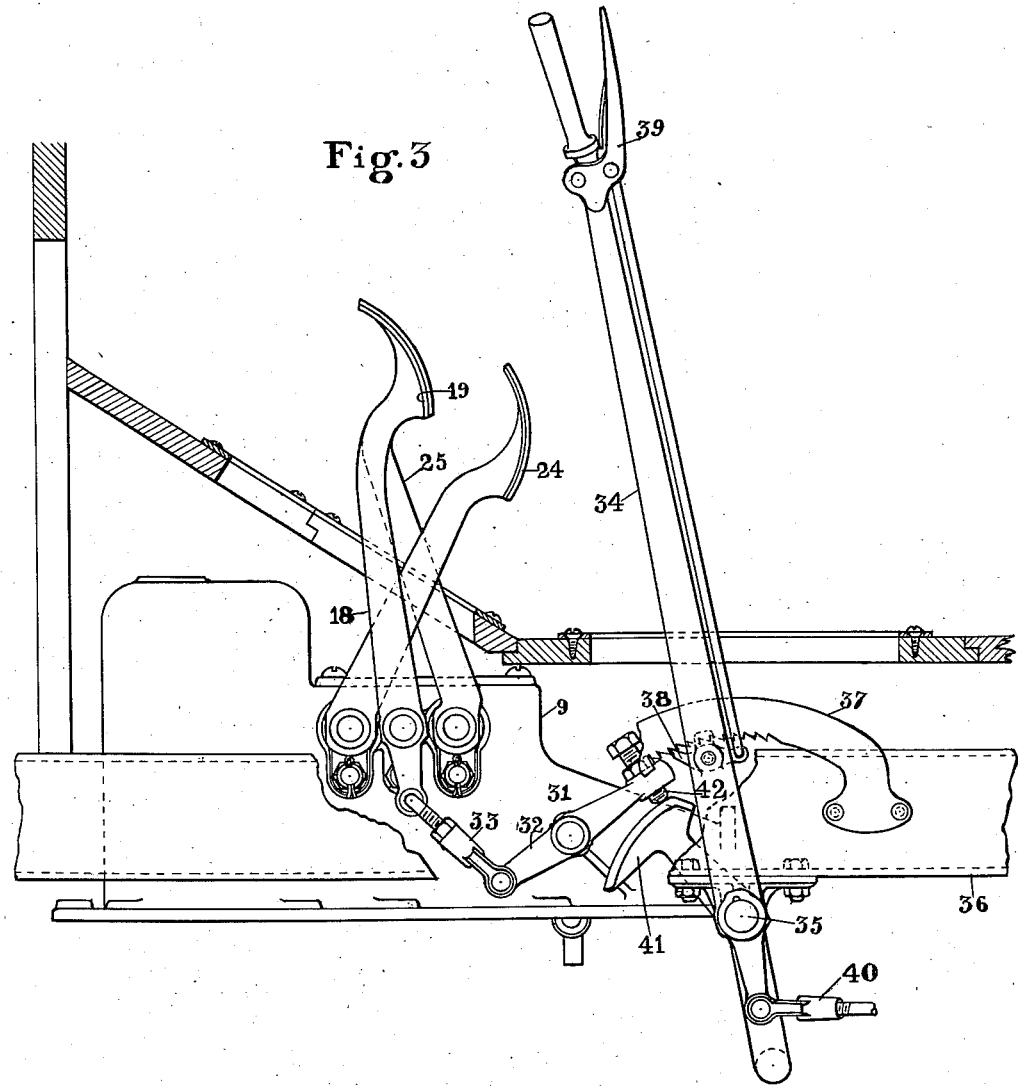
Figures 4, 5:
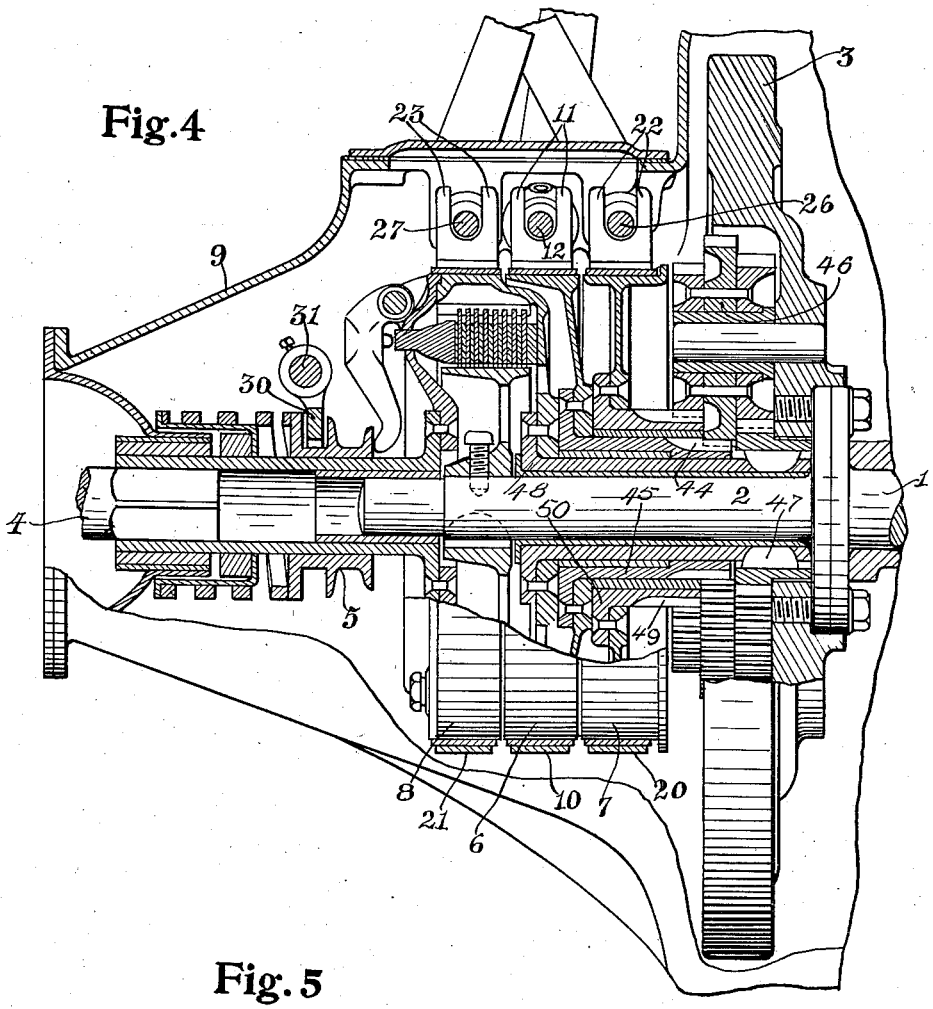

Referring to the drawings, Figure 1 is a plan view of controlling, speed changing and brake operating mechanism of an automobile with a gear case and adjacent portions of a chassis, that embody features of the invention; Fig. 2 is a view in side elevation of the mechanism showing the parts in "neutral" position; and Fig. 3 is a view partly in side elevation and partly in section, showing the connection of operating pedals or levers with change-speed gearing; Fig. 4 is a view in detail, enlarged, of change speed gearing; Fig. 5 is a view in detail of a pedal, rock arm and adjacent parts.

As herein illustrated, the mechanism controls a planetary transmission mechanism in which the arresting or locking of one drum gives slow speed ahead, and of a second drum, reverses the car, a direct drive clutch being used for high speed. The transmission mechanism may be of any preferred form of this class, and is not *per se* a part of the invention. Preferably it is of the type disclosed and claimed in my application for Letters Patent of the United States on transmission mechanism filed August 12, 1909, under Serial No. 512,502. In such mechanisms an engine main shaft 1 with an extension 2 thereon beyond a flywheel 3 may be coupled to a transmission shaft 4 through a clutch that is thrown in and out by a collar 5 shiftable on the shaft extension. Change speed is afforded by the locking of a drum 6 from rotation and reversal of direction by holding a drum 7 stationary, these forming part of a planetary gear train mounted on the extension. A service brake drum 8 houses the clutch.

A transmission casing cover 9 houses the transmission gearing. A friction band 10 encircles the drum 6 and ears 11 on its ends embrace a spindle 12 between a bearing 13 in which the spindle is rotatable and longitudinally reciprocable, and a stop 14 on the spindle. An outer bearing 15 supports the outer extremity of the spindle. An oblique cam face 16 on the end face of the bearing 13 coacts with a mating face on an enlarged portion 17 of the spindle, to move the spindle longitudinally in the bearings to draw the band ears 11 together, when the spindle is turned by pressing forward a suitable rock arm 18 terminating in a pedal 19. Similarly, friction bands 20 and 21, with ears 22 and 23, may be brought into engagement with the drums 7 and 8 respectively by pedals 24 and 25 rocking longitudinally shiftable spindles 26 and 27 in bearings 28 and 29. The ears of the bands and the spindles are returned to place by suitable springs 44.

The clutch collar 5 is shifted by a yoke 30 that is secured to a transverse shaft 31 journaled in the casing cover 9. One arm of a lever 32 secured to the yoke shaft, is coupled by an adjustably extensible link 33 to a depending arm of the pedal lever 18, and the parts are so arranged that the clutch is thrown out by the pedal when the latter is moved sufficiently to set up the change speed drum band 10 and thus "throw in" the intermediate speed gearing, as it stops the rotation of the change speed drum 6. This in turn locks a pinion 44 that is keyed to an extension 45 of the hub of the drum 6, from rotating and causes it to rotate planet gears 46 with one step of each of which it is in mesh. These planetary gears 46 through another step engage a pinion 47 on the sleeve 48 of the casing or drum 8 which forms part of the clutch mechanism and therefore drives the transmission shaft 4 at a speed proportionate to the ratio of the intermeshing gears and pinions. Reverse direction is obtained by locking the drum 7 by the band 20, whereby a gear 49 on a sleeve 50 of said drum is held from turning. This likewise drives the planetary gears to rotate the shaft 4 in reverse direction to the motor shaft.

An emergency brake hand lever 34 is secured adjacent the casing on a rock-shaft 35 that is journaled in suitable bearings on members 36 of the chassis, and is detachably interlocked with a quadrant 37 through the medium of a latch 38 and handle 39. Suitable connections 40 on the rock-shaft lead to an emergency brake (not shown). A segmental guard plate 41 on the rock-shaft is adapted to underrun an adjustable stop-pin 42 on the free arm of the yoke shaft lever 32 when the hand lever 34 is retracted to set the emergency brakes, and thus release the intermediate gear drum or the direct drive clutch, and prevents injury to the mechanism. When the hand lever is thrown forward of a substantially central, neutral position, it clears the stop-pin 42 sufficiently to permit the operator to manipulate the slow speed pedal. Furthermore, when the hand lever is well forward, and the slow speed pedal left clear, a spring 43 moves the collar 5 along and throws the direct drive clutch in, or by throwing the lever clear ahead, the clutch is positively engaged. By this arrangement of parts, the driver by proper manipulation of the foot pedals moves the car forward at either full or slow speed and reverses it at will. Or he may apply the emergency brakes without fear of injuring the transmission mechanism which is automatically released. The lever which controls the emergency brakes, likewise, when in neutral position, locks the clutch from being thrown in, and when forward, allows the clutch to operate unless the driver depresses the slow speed pedal, thereby moving back the clutch collar.

All the operating members of the control are mounted in the transmission case cover which affords a rigid support that holds the parts in alinement and insures proper working of the device.

Obviously changes in details of construction may be made without departing from the spirit of the invention and I do not limit myself to any particular form or arrangement of parts.

What I claim as my invention is:—

1. The combination in an automobile of a main shaft, a transmission shaft, a clutch for coupling the shafts together and a variable speed planetary transmission mechanism adapted to connect the shafts, with controlling means for throwing the clutch in and out, the controlling means being also adapted to hold the clutch released when the mechanism connecting the shafts is operative and to hold the mechanism in inoperative position when the clutch is engaged.

2. The combination in an automobile of a main shaft, a transmission shaft, a clutch for coupling the shafts together, and a variable speed planetary transmission mechanism adapted to connect the shafts with means for locking any one of the change speed members of the transmission mechanism in operative position, and means for operating the clutch and means adapted to automatically hold the clutch released when the change speed mechanism is operative and to hold the latter inoperative when the clutch is engaged.

3. The combination in an automobile of a main shaft, a transmission shaft, a self-closing clutch for coupling the shafts, and a variable speed transmission mechanism adapted to connect the shafts with control members each adapted to hold one of the change speed members of the transmission mechanism in operative position and means adapted to positively release the clutch when the transmission mechanism is operatively connecting the shafts.

4. The combination in an automobile of a main shaft, a transmission shaft, a self-closing clutch for coupling the shafts, and a variable speed transmission mechanism adapted to connect the shafts, with control members each adapted to lock one of the change speed members of the transmission mechanism in operative position, a lever adapted to positively lock the clutch when in one position, and connections between the change-speed control members and lever adapted to hold the transmission mechanism in neutral position when the clutch is engaged and to hold the clutch in released position when the transmission mechanism is operatively connecting the shafts.

5. The combination in an automobile of a main shaft, a transmission shaft, a clutch for coupling the shafts, means for throwing the clutch in and out of gear, and a variable speed transmission mechanism adapted to connect the shafts, with a member for holding a change speed member of the transmission mechanism in operative position, a lever controlling the clutch throwing means, and connections between the said locking member and clutch lever adapted to hold the clutch released when the mechanism is operating and to hold the mechanism inoperative when the clutch is engaged.

6. The combination in an automobile, of a main shaft, a transmission shaft, a clutch for coupling the shafts, a transmission mechanism mounted on the main shaft and connected to the transmission shaft, and a lever adapted to throw the clutch into engagement, with members each adapted to hold a member of the transmission mechanism in operative position, and connections controlling the clutch and mechanism locking means adapted to hold either the mechanism or clutch released when the other is engaged.

7. The combination in an automobile of a main shaft, a transmission shaft, a clutch for coupling the shafts, a planetary gear transmission mechanism mounted on the main shaft and connected to the transmission shaft and a lever for operating the clutch, with pedals each operatively connected to a change speed member of the mechanism to hold said member in operative position whereby the mechanism drives the transmission shaft from the main shaft, and connections between the pedals and lever adapted to hold the mechanism inoperative when the clutch is engaged and to hold the clutch disengaged when the mechanism is operatively connecting the shafts.

8. The combination in an automobile of a main shaft, a transmission shaft, a clutch for coupling the shafts, a planetary gear train mounted on the main shaft and connected to the transmission shaft, and a lever for operating the clutch, with a casing housing the train, and change-speed and reversal pedals secured to the casing and each adapted to lock a member of the train in operative position, and a clutch-release member on the casing connected to the change-speed pedal and the clutch operating lever, and adapted to hold the train inoperative when the clutch is engaged, and the latter released when the train is operating.

9. The combination in an automobile of a main shaft, a transmission shaft, a clutch for coupling the shafts, a collar longitudinally reciprocable on the shaft for throwing the clutch in, a spring normally holding the clutch yieldingly engaged, a planetary gear train on the main shaft connected to the transmission shaft, and pedals for locking the change-speed and reverse members in operative position, with a yoke for positively shifting the collar, a lever for operating the yoke, and connections between the lever, yoke and change-speed means to hold the clutch disengaged when the train is operating, and to hold the latter inactive when the clutch is engaged.

10. In an automobile, a chassis, a main shaft and a transmission shaft thereon, a clutch for coupling the shafts, a collar movable longitudinally on the shaft for throwing the clutch in, a planetary gear train on the main shaft connected to the transmission shaft, change-speed and reversal drums in the train, a service brake drum in the train, friction bands each encircling a drum, a casing housing the clutch and the train, pedals pivoted on the casing each adapted when depressed to move a band into engagement with the companion drum, a shaft journaled in the casing and operatively connected to the clutch collar, and connections between the change speed lever and collar shaft adapted to hold the collar and clutch in disengaged position when the change-speed drum band pedal is in engaged position.

11. The combination in an automobile of a main shaft, a transmission shaft, a clutch for coupling the shafts, a collar longitudinally movable on the shaft for operating the clutch, a change-speed gear train mounted on the main shaft and connected to the transmission shaft, a brake, change-speed and reverse drums in the train and friction bands each encircling a drum, with a casing housing the clutch and drums, a longitudinally reciprocable spindle journaled in the casing adjacent each band and adapted to close the band on its drum when moved axially, means on the casing to move each spindle axially when turned, and a pedal for turning each spindle, a shaft journaled in the casing for shifting the clutch collar, a lever for turning the collar shaft, and means for connecting the change-speed spindle and collar shaft adapted to hold the clutch released when the change-speed band is applied and to hold the change-speed band released when the clutch is applied.

12. The combination in an automobile of a chassis, a main shaft, a transmission shaft, a clutch for coupling the shafts, a collar longitudinally movable on the shaft for operating the clutch, a change-speed gear train mounted on the main shaft and connected to the transmission shaft, brake, change-speed and reverse drums in the train and friction bands each encircling a drum, with a casing housing the clutch and drums, a longitudinally reciprocable spindle journaled in the casing adjacent each band and adapted to close the band on its drum when moved axially, means on the casing to move each spindle axially when turned, and a pedal for turning each spindle, a shaft journaled in the casing for shifting the clutch collar, a lever on the chassis for turning the collar shaft, a latch and quadrant for locking the lever, and means connecting the change-speed spindle and collar shaft adapted to hold the clutch released when the change-speed band is applied and to hold the change-speed band released when the clutch is applied.

13. The combination in an automobile of a main shaft, a transmission shaft, and a planetary change-speed gear train mounted on the main shaft and connected to the transmission shaft, a brake drum, a change-speed drum and a reverse drum in juxtaposition concentrically in the train on the main shaft, with a casing housing the gear train, spindles journaled thereon transversely to the axis of the drums, cam collars on the spindles coacting with the casing to shift the spindles longitudinally as they turn, friction bands each encircling a drum with its ends engaged by an adjacent spindle to close when the latter shifts, and pedals for turning the spindles.

14. The combination in an automobile of a main shaft, a transmission shaft, and a planetary change-speed gear train mounted on the main shaft and connected to the transmission shaft, including a brake drum, a change-speed drum and a reverse drum in juxtaposition concentrically on the main shaft, with a casing housing the gear train, spindles journaled thereon transversely to the axis of the drums, cam collars on the spindles coacting with the casing to shift the spindles longitudinally as they turn, friction bands each encircling a drum with its ends engaged by an adjacent spindle to close when the latter shifts, a collar for operating a clutch longitudinally movable on the main shaft adjacent the drums, a shaft journaled in the casing transverse to the main shaft and adjacent the collar, a yoke on the transverse shaft engaging the collar, a lever secured on the transverse shaft, and a link between said lever and the change-speed drum band pedal and adapted to hold the shaft and collar to disengaged position when the pedal move the band into engagement with the adjacent drum.

15. The combination in an automobile of a main shaft, a transmission shaft, and a planetary change-speed gear train mounted on the main shaft and connected to the transmission shaft, a brake drum, a change speed drum and a reverse drum in juxtaposition concentrically on the main shaft, with a casing housing the gear train, spindles journaled thereon transversely to the axis of the drums, cam collars on the spindles coacting with the casing to shift the spindles longitudinally as they turn, friction bands each encircling a drum with its ends engaged by an adjacent spindle to close when the latter shifts, a collar for operating a clutch longitudinally movable on the main shaft adjacent the drums, a shaft journaled in the casing transverse to the main shaft and adjacent the collar, a yoke on the transverse shaft engaging the collar, a lever secured on the transverse shaft, a chassis in which the several parts are mounted, a rock-shaft on the chassis, a latch-lever thereon engaging a quadrant, and a segmental guard plate on the rock-shaft adapted to move the transverse shaft yoke lever into engaged position and the change-speed pedal into disengaged position when the latch lever is thrown toward an end of the quadrant.

In testimony whereof I affix my signature in presence of two witnesses.

HENRY FORD.

Witnesses:
ANNA M. DORR,
ANNA M. SHANNON.